US011636043B2

(12) United States Patent
Wait et al.

(10) Patent No.: US 11,636,043 B2
(45) Date of Patent: Apr. 25, 2023

(54) SLEEPING AND WAKING-UP ADDRESS TRANSLATION THAT CONFLICTS WITH TRANSLATION LEVEL OF ACTIVE PAGE TABLE WALKS

(71) Applicant: INTERNATIONAL BUSINESS MACHINES CORPORATION, Armonk, NY (US)

(72) Inventors: Charles D. Wait, Byron, MN (US); Jake Truelove, Austin, TX (US); David Campbell, Austin, TX (US); Jody Joyner, Austin, TX (US); Jon K. Kriegel, Rochester, MN (US); Glenn O. Kincaid, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/461,919

(22) Filed: Aug. 30, 2021

(65) Prior Publication Data
US 2023/0062909 A1 Mar. 2, 2023

(51) Int. Cl.
*G06F 12/1009* (2016.01)
(52) U.S. Cl.
CPC .............................. *G06F 12/1009* (2013.01)
(58) Field of Classification Search
CPC .................................................. G06F 12/1009
See application file for complete search history.

(56) References Cited

U.S. PATENT DOCUMENTS 5,613,083 A * 3/1997 Glew .................. G06F 12/1027
711/208
7,334,108 B1 2/2008 Case et al.
(Continued)

FOREIGN PATENT DOCUMENTS

CN 1779663 A 5/2006
CN 113297105 A 8/2021

OTHER PUBLICATIONS

Mell, P. et al., "Recommendations of the National Institute of Standards and Technology"; NIST Special Publication 800-145 (2011); 7 pgs.
(Continued)

*Primary Examiner* — Chie Yew
(74) *Attorney, Agent, or Firm* — Intelletek Law Group, PLLC; Gabriel Daniel, Esq.

(57) ABSTRACT

A memory address translation system includes a translation requestor module configured to provide translation requests from a virtual address to a real address of a physical memory. A translation cache module is configured to receive the translation request from the translation requestor module. A sleep and wake control module is configured to compare the received VA to VA's of all presently active table walks of the table walk machines. Upon determining that there is an address match in a given table walk machine, the translation request is sent with an identification number (ID) to the translation requestor module, to be put to sleep. Each table walk machine is configured to provide a wake-up signal having an ID to the translation requestor module upon completion of its translation level, thereby triggering a waking up and processing of a presently sleeping translation request, to provide parallel translation table walks.

20 Claims, 7 Drawing Sheets

(56) References Cited

U.S. PATENT DOCUMENTS

| | | |
|---|---|---|
| 10,007,619 B2 | 6/2018 | Podaima et al. |
| 10,083,124 B1 | 9/2018 | Brandt et al. |
| 10,649,778 B1 | 5/2020 | Campbell et al. |

OTHER PUBLICATIONS

Skarlatos, D. "Elastic Cuckoo Page Tables: Rethinking Virtual Memory Translation for Parallelism"; ASPLOS (2020); 16 pgs.

Shin, S. et al., "Neighborhood-Aware Address Translation for Irregular GPU Applications"; IEEE (2018); 12 pgs.

International Search Report and Written Opinion dated Oct. 14, 2022 in related International Patent Application No. PCT/CN2022/104892, 9 pgs.

\* cited by examiner

Example Sleep/Wake Parallel Table Walk Radix Translation

| 4 Level Radix Tree Walk (52 bit VA) | | |
|---|---|---|
| | Add_bits | Page Region/Size |
| L1 | (12:24) | (512G region) |
| L2 | (25:33) | (1G region /pgsz) |
| L3 | (34:42) | (2M region /pgsz) |
| L4 | (43:51) | (4k pgsz) |

FIG. 3A

Two Example VA's

| | (12:24) | (25:33) | (34:42) | (43:51) |
|---|---|---|---|---|
| VA' | X017 | X29 | X1E | X86 |
| VA" | X017 | X29 | X07 | X86 |

FIG. 3B

SLEEPING AND WAKING-UP ADDRESS TRANSLATION THAT CONFLICTS WITH TRANSLATION LEVEL OF ACTIVE PAGE TABLE WALKS

BACKGROUND

Technical Field

The present disclosure generally relates to computer systems, and more particularly, to managing memory tables in a processing system.

Description of the Related Art

In recent years, the operating system of a computing platform uses a combination of hardware and software to map memory addresses used by a program, sometimes referred to as virtual addresses, into physical addresses in the memory of the computer. In this way, the main storage appears as uniform segments in a contiguous address space. An operating system manages virtual address spaces and the assignment of real (physical) memory to virtual memory. Address translation hardware in the processor, sometimes referred to as the memory management unit (MMU), translates virtual addresses to physical addresses. The software within the operating system may provide a virtual address space that is larger than the capacity of the real memory, thereby referencing more memory than is physically present in the computing platform. By using virtual memory, the software can use more memory than might be physically available. Virtual memory simplifies application programming by camouflaging fragmentation of the physical memory.

Today's computing systems use different address translation mechanisms based on the type of operating system that is used. In order to support multiple computer system environments, address translation hardware should support multiple page sizes when translating from a Virtual Address (VA) to a real (i.e., physical) address (RA). As used herein, an effective address (EA) is the address that a program sees; a virtual address (VA) is the address used by the OS; and the real address (RA) is the address of the actual memory hardware.

When translating an EA or VA to ultimately an RA, a processor typically performs a time intensive process of walking the translation tables in order to produce the correct address so that the appropriate memory address can be accessed. The page table is where the operating system stores its mappings of virtual addresses (VA) to physical addresses, with each mapping also known as a page table entry (PTE). The results of the translation walk are usually cached for later use. However, the time intensive table walk process executes first, involving many memory reads, cache accesses, and may halt progress of the hardware threads or entire processor core.

SUMMARY

In various embodiments, a method, system, and a computing device for providing a memory address translation in a multiple page size environment includes receiving a translation request from a virtual address (VA) to a real address (RA) of a physical memory. The received VA to VA's of all presently active table walks of a group of table walk machines are compared. Upon determining, based on the comparison, that there is an address match in a given table walk machine of the group of table walk machines, the translation request is sent with an identification number (ID) to a translation requestor module, to be put to sleep. Upon determining that the given table walk machine has completed its translation level, a wake-up signal with the ID is sent to the translation requestor module to trigger a wake-up and processing of the put to sleep translation request. A table walk of the VA of the translation request with the ID is provided in parallel with one or more other table walks of other translation requests of the group of table walk machines.

In one embodiment, the comparison of the received VA to the VA's of the presently active table walks comprises, for each presently active table walk: comparing virtual address bits of the received VA to a range of addresses in a translation level of the presently active table walk.

In one embodiment, for each active table walk, a state (i.e., translation level) of the table walk is used to determine a number of address bits to compare to determine whether there is an address collision.

In one embodiment, the comparison of the received VA to the VA's of the presently active table walks includes, for each presently active table walk, comparing the most significant bits (MSB's) of the address down to the bit boundary of the largest page size supported.

In one embodiment, upon determining, based on the comparison, that there is not an address match in a given table walk machine of the group of table walk machines, the translation request to be processed is sent directly by a table walk machine of the group of table walk machines.

In one embodiment, upon receiving the translation request, a translation cache module determines whether the translation request of the VA was previously successfully processed. Upon determining that the translation request of the VA was not previously successfully processed, the translation request is sent directly to one or more table walk machines.

In one embodiment, the translation request includes at least one of: a hashed page table (HPT) request, a segment table request, a non-nested radix request, or a nested radix request.

In one embodiment, the completed translation level is a Level 1 Radix Tree Directory Base (RTDB), which is used as a base address of a first radix translation table.

In one embodiment, a next level of the given table walk machine is a Page Table Entry (PTE), which is used to define a next range of a translation. A next level could also be a Page Directory Entry (PDE). Whereas a PTE includes the physical address of the translation, a PDE includes a Radix Tree Directory Base (RTDB), which is a base pointer to the next radix table. Both can be used to define an address range for comparison.

By virtue of the teachings herein, a more efficient memory address translation is provided that offers parallel processing of translation requests. These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 1 is a conceptual block diagram of a memory address translation system supporting multiple parallel table walks, consistent with an illustrative embodiment.

FIG. 3A is an example sleep/wake parallel table walk, consistent with an illustrative embodiment.

FIG. 3B is a table of two virtual address translation requests that are processed by the system, consistent with an illustrative embodiment.

DETAILED DESCRIPTION

Overview

Figure 1:
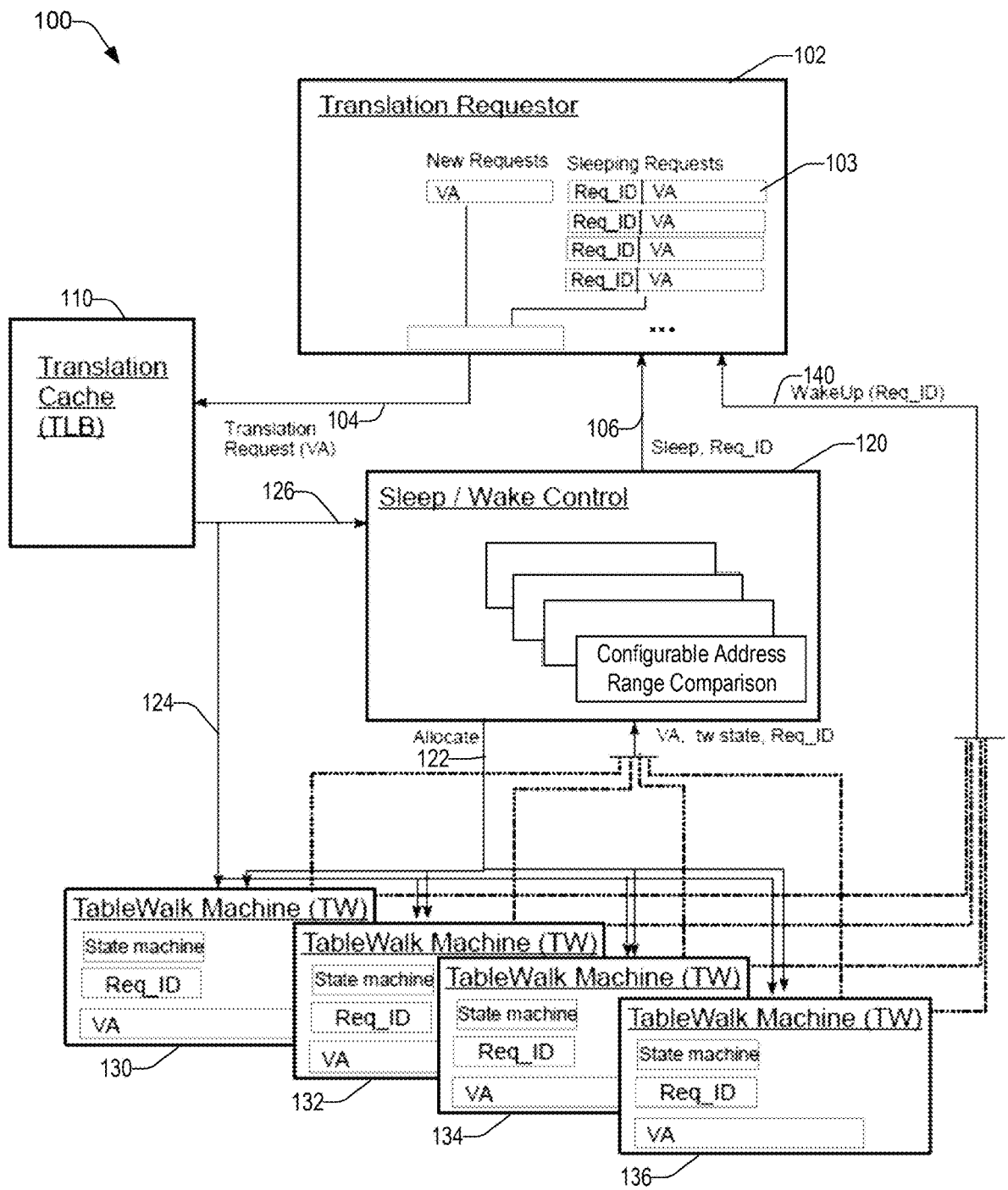

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and methods of managing memory tables in a processing system. Today, processor cores have been developed that can support different operating environments and virtual machines. For example, part of a computing system can run a radix mode of translations, which uses a series of nested tables instead of a single large hashed table to find page table entries for its particular operating system (OS), whereas another part of the system runs a power PC, which uses a different mode of translation for its corresponding OS. For example, a hypervisor, sometimes referred to as a virtual machine monitor (VMM), can create and run virtual machines (VMs) by isolating the hypervisor operating system and resources from the virtual machines and enables the creation and management of such machines, which can be based on different OS, while sharing the same hardware. Each operating system may involve a different address translation based on different page tables. When a process requests access to data in its memory, it is the responsibility of the OS to map the virtual address (VA) provided by the process to the physical address of the actual memory where that data is stored. The page table is where the operating system stores its mappings of virtual addresses to physical addresses, with each mapping also known as a page table entry (PTE). Since different operating systems are used, there may be different translation units, sometimes referred to herein as translation modes.

PTEs are typically used to translate the virtual addresses seen by an operating system into physical addresses used by the hardware to process instructions of the application program. The hardware that performs such translation is sometimes referred to as a memory management unit (MMU). Each entry in a page table includes an indication of whether or not the corresponding page is in physical memory. If it is in physical memory, the page table entry will include the actual memory address at which the page is stored. When a reference is made to a page by the hardware, if the page table entry for the page indicates that it is not currently in physical memory, the hardware raises a page fault exception, invoking the paging supervisor component of the operating system.

Today, high end computer systems can support multiple page sizes, which presents problems when implementing performance enhancing simultaneous table walks. When a hardware design has multiple table walk engines, a new translation request checks the currently active table walk engines for virtual address collisions. Address collisions occur when two VA's translate to the same page.

Typically, if a new VA translation request could possibly be to the same page as an active translation table walk, it is stalled in order to avoid multiple entries in the translation cache for the same page. Such stalling, destroys the performance enhancing advantages of multiple hardware table walk engines.

The teachings herein provide a sleep and/or wakeup interface, as well as supporting hardware logic between a translation requestor and multiple translation table walk (TW) engines to allow overlap of simultaneous table walks. When a new translation request is received, the system uses an active table walk engine's state of progress to determine the number of VA bit's to compare. With multiple active TW engines, each engine will generate its own range of VA bits based on its individual translation walk progress. The results of the comparison determines if the new translation is "put to sleep." The new translation receives a "wake-up" when the active TW engine has progressed to the next translation level allowing simultaneous overlap.

In one aspect of the present disclosure, new requests are only "put to sleep" temporarily until the active TW engine can guarantee the new request will not share the same page. At this point, the active table walk "wakes up" the new request, thereby allowing it to not only operate in parallel, but also take advantage of the current (i.e., active) translation walk progress. For example, the new request can take advantage of the active translation walk progress if the active walk stores intermediate results in the Translation Cache. In some scenarios, a separate Page Walk Cache (PWC) is used for these intermediate results.

In an embodiment where multiple page sizes are supported, the address collision logic compares the most significant bits (MSB's) of the address down to the bit boundary of the largest page size supported. Without the teachings herein, the new request would be stalled until the active translation causing the address collision is resolved, thereby substantially slowing down the computing system.

Accordingly, the teachings herein provide a computer system and methods for a processor that supports multiple page sizes and simultaneous table walks. The techniques described herein may be implemented in a number of ways. Example implementations are provided below with reference to the following figures.

Example Architecture

Reference now is made to FIG. 1, which is a conceptual block diagram of a memory address translation system 100 supporting multiple parallel table walks, sometimes referred to as a memory management unit (MMU), consistent with an illustrative embodiment. The system 100 includes a translation requestor 102 configured to provide a request for an RA based on a VA. For example, the translation request may be a hashed page table (HPT) translation request, a segment table translation request, a non-nested radix request, nested radix request, etc.

There is a translation cache—translation lookaside buffer (TLB) interface 110, configured to receive the cache request from the translation requestor module 102 and provide the request to one or more table walk (TW) machines 130 to 136 and the sleep and wake control module 120 depending on whether there is an address "miss" 126 in the TLB. The TLB is a memory cache that is operative to reduce the time taken to access a user memory location. The TLB 110 stores previous successful translation results. For example, the TLB 110 may include different types of previous translations, such as EA to VA, VA to RA, and EA to RA. If a previously successful translation request for a similar request is found by the TLB 110 (i.e., TLB "hit"), the request is returned to the translation requestor with the physical RA. However, if the new translation request 104 from the translation requestor module 102 misses the TLB 110 (i.e., a formerly successfully translation request is not identified with respect to the present address, and therefore, a TLB miss), the new request VA 104 is forwarded to the sleep and wake control module 120.

The sleep and wake control module 120 compares the received virtual address with virtual addresses with presently active table walks (e.g., 130 to 136). The address range is configured by the state of the table walk. As used herein, the state of a table walk relates to the level of the radix tree the active table walk is currently operating on. For example, if the active walk were operating on level 2, then the address range compared would be 12:33; for level 3, 12:42; and so on.

Upon determining that there is an address match in a presently active table walk, the new translation request is returned 106 to the translation requestor module 102, with a sleep request (e.g., "put-to-sleep" on Active TW (Req_ID). Accordingly, the translation requestor module 102 stores the new translation request as a sleeping request (e.g., 103) having a corresponding request identification (ID) number. However, if there is no address match, the new translation request is allocated 122 to a TW machine (e.g., 130 to 136). In one embodiment, there is a direct path from the translation cache 110 to table walk machines 130 to 136. This path 124 is configured to supply the VA directly to the table walk machines 130 to 136. If intermediate results from an Active TW were stored in the translation cache 110, the path 124 could provide them to a new translation request too.

The active table walk machine completes a corresponding radix translation level (e.g., L1, L2, L3, L4, etc.,) and sends a "wake-up" signal 140 with its corresponding ID to the translator requestor module 102, which triggers the translation requestor module 102 to resend the now sleeping translation request, based on the received ID. When a new translation request is "put to sleep," it is the active TW ID with the address collision that is associated with it. Accordingly, when the active TW completes a radix level, it sends its ID 140 to the translation requestor 102, which then wakes up any sleeping "new" requests 103 having the same ID. In one embodiment, more than one sleeping requests can be activated (i.e., woken up) by a single ID.

Figure 2:
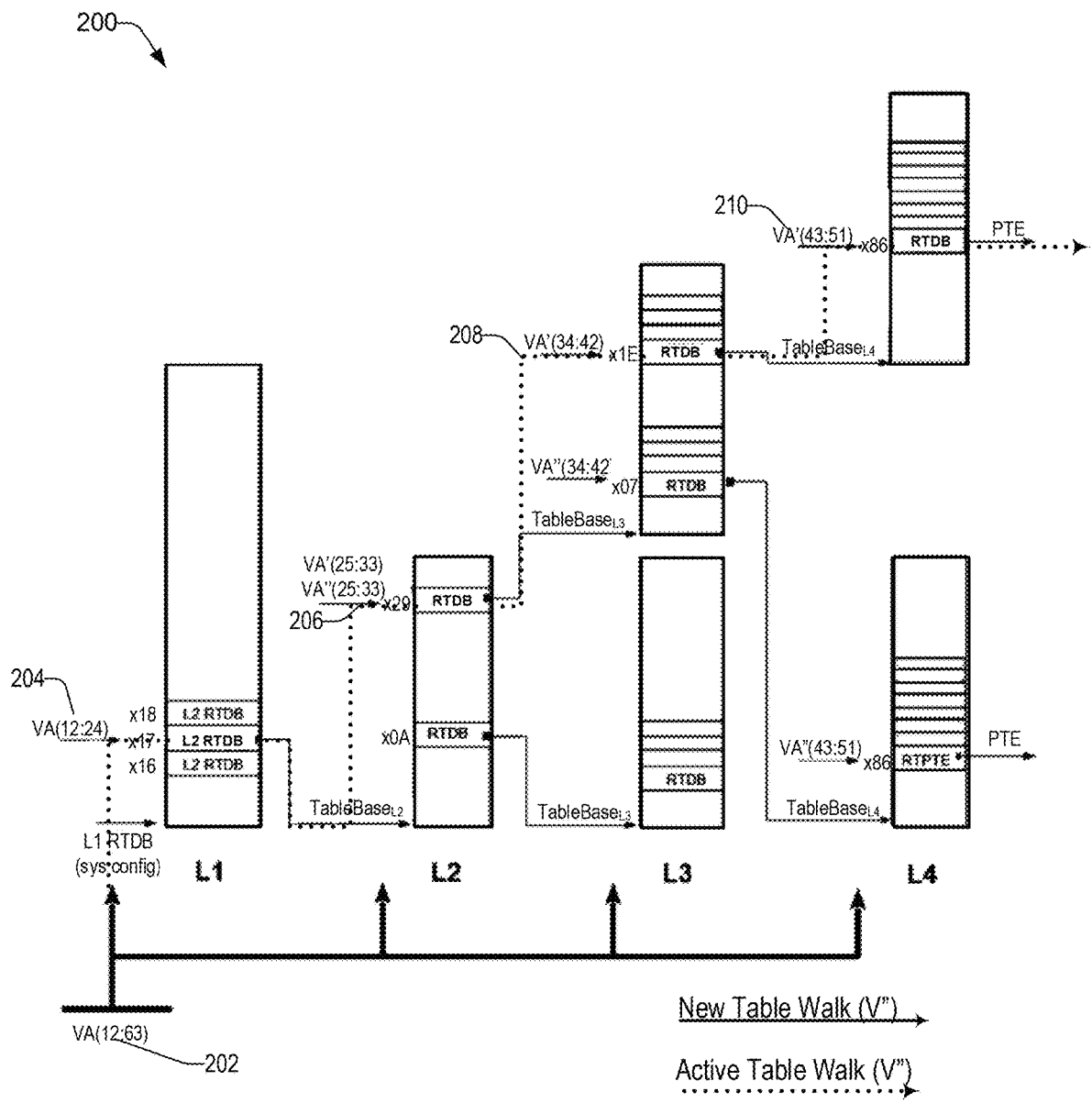
FIG. 2 is a conceptual process flow diagram for a memory address translation in a multiple page size environment, consistent with an illustrative embodiment.

Reference now is made to FIG. 2, which is conceptual process flow diagram for a memory address translation in a multiple page size environment, consistent with an illustrative embodiment. By way of example only and not limitation, consider two radix translation requests of 64-bit VA's where the supported possible page sizes are 1G, 2M, and 4K. Without the teachings herein, every translation request in the same 1G address range, VA (0:33)<big endian>, would be stalled if there's one active table walk in that range; regardless of what the actual (unknown) page size may be. If the actual page size were 4 k, then (250,000−1) other possible 4 k page translations will be abruptly stalled, thereby preventing any table walk overlapping.

Reference now is made to FIGS. 3A and 3B, which provide an example sleep/wake parallel table walk, consistent with an illustrative embodiment. For example, during a radix translation walk, sets of translation tables are accessed at each translation walk level. The VA is divided into separate groups of address bits where each group is used to index into a translation table at a given translation level (e.g., L1 to L4 in FIG. 3A). The translation table entry includes the base address of a translation table at the next translation walk level, which is then indexed by the next group of VA bits.

FIG. 3B is a table of two virtual address translation requests that are processed by the system, consistent with an illustrative embodiment. VA' represents a first (e.g., existing) translation request that is currently being processed by a table walk engine, whereas VA" represents a second (i.e., new) translation request that is received after the first translation request. As illustrated in the example of FIG. 3B, at level 1 (i.e., (12:24)) the address is the same (i.e., X017) thereby potentially leading to a translation collision. In this regard, VA" is put to sleep until the active table walk for Level 1 for VA' completes. Similarly, at level 2 (i.e., (25:33)) the address is the same (i.e., X29). Consequently, VA" is stalled (e.g., put to sleep) until this level 2 is completed for VA' by the corresponding table walk engine.

In contrast, for level 3, a comparison between VA' and VA" indicates that the addresses are different (i.e., X1E vs. X07) for that translation level, thereby allowing VA' and VA" to be processed concurrently (e.g., in parallel) by the same table walk engine. Accordingly, even if the page sizes are different, the teachings herein facilitate an efficient processing of address translation requests that maximizes parallelization of processing, thereby greatly enhancing the throughput of memory address translations.

Returning to FIG. 2, consider for example a radix table walk of VA(12:63) 202. Since the smallest page size is 4 k (see L4 in FIG. 3A), VA(12:51) can be translated to a Real (Address) Page Number, RPN (12:51).

The Level 1 Radix Tree Directory Base (RTDB) is the base address of the first radix translation table and a system provided RA. VA(12:24) 204 are used to index into this translation table and the accessed entry includes the Level 2 RTDB. VA(25:33) 206 index the Level 2 table to find the Level 3 RTDB. VA(34:42) 208 indexes the Level 3 table to find the Level 4 RTDB. Finally, VA(43:51) 210 indexes the Level 4 table to find the Page Table Entry (PTE), which defines the VA(12:51) to RPN(12:51) translation.

In one embodiment, the active walk stores intermediate results in an Translation Cache. A separate Page Walk Cache (PWC) can be used for intermediate results. For example, 206 points to an RTDB found by the active walk. If cached, it could be used by a new "awoken" translation request, thereby taking advantage of the status of the present active table walk.

It should be noted that the RTDB as the base address of the translation table is provided by way of example and not limitation. Other pointers could be used as well. For example, in one embodiment, the Level 2 table entry could be a PTE instead of an RTDB. In this embodiment, the page size can be 1 G. Similarly, the Level 3 table entry could be a PTE, in which case the page size is 2 M, as illustrated in the table of FIG. 3A.

In one embodiment, at each level of the tree, the mapping of a VA to RTDB is saved in a Page Walk Cache (PWC) in order to speed up subsequent table walks. For example, a PWC entry for VA(12:42) will provide the Level 4 RTDB.

When a new translation request is received by a group of table walk (TW) engines, the system performs an address collision compare with active TW engines. If VA (12:33) of an active TW engine (1 G boundary) matches the new request and the TW engine has not yet accessed the L2 translation table entry, then the new request is "put to sleep" temporarily until the active TW engine has determined there is no 1 G PTE (L2). Stated differently, the new request is "put to sleep" temporarily until the active TW engine has accessed the Level 2 table entry—and, if not PTE, progressed to working on Level 3. Because the largest page size supported in this example is 1G, it corresponds to Level 2 of the radix tree, which in turn corresponds to (12:33).

In this scenario, the translation requestor stalls its request until the active TW engine sends a Wake-Up signal. The TW engine sends the Wake-Up signal after accessing the L2 table entry and begins accessing the L3 entry.

At this point the new translation request is sent again to the group of one or more TW engines, and again VA(12:33) are compared. But this time, the active TW engine has progressed beyond the L2 translation table, so no sleep signal is generated by this comparison.

However, if the active TW engine has not yet accessed the L3 translation table, then the VA comparison is expanded to VA(12:42). If the VA's miscompare, the new request is allocated to an idle (e.g., available) TW engine and the two translation walks can operate in parallel unabated.

When a new translation request is received, the system uses an active TW entry's state of progress (i.e., translation level) to determine a number of VA bit's to compare. It should be noted that, with multiple active TW engines, each engine generates its own range of VA bits based on its individual translation walk progress.

In one embodiment, in addition to operating translation walks in parallel, when the active TW engine sends the "Wake-Up" signal, it also writes the PWC for VA(12:33) including the Level 3 RTDB, which the new request can leverage immediately. Although not explicitly described, the teachings herein also support a "sleep/wakeup" flow when there's a VA(12:42) collision with an active TW engine that has not yet accessed the L3 RTDB (2 M boundary/potential PTE), as well as higher levels.

Example Process

Figure 4:
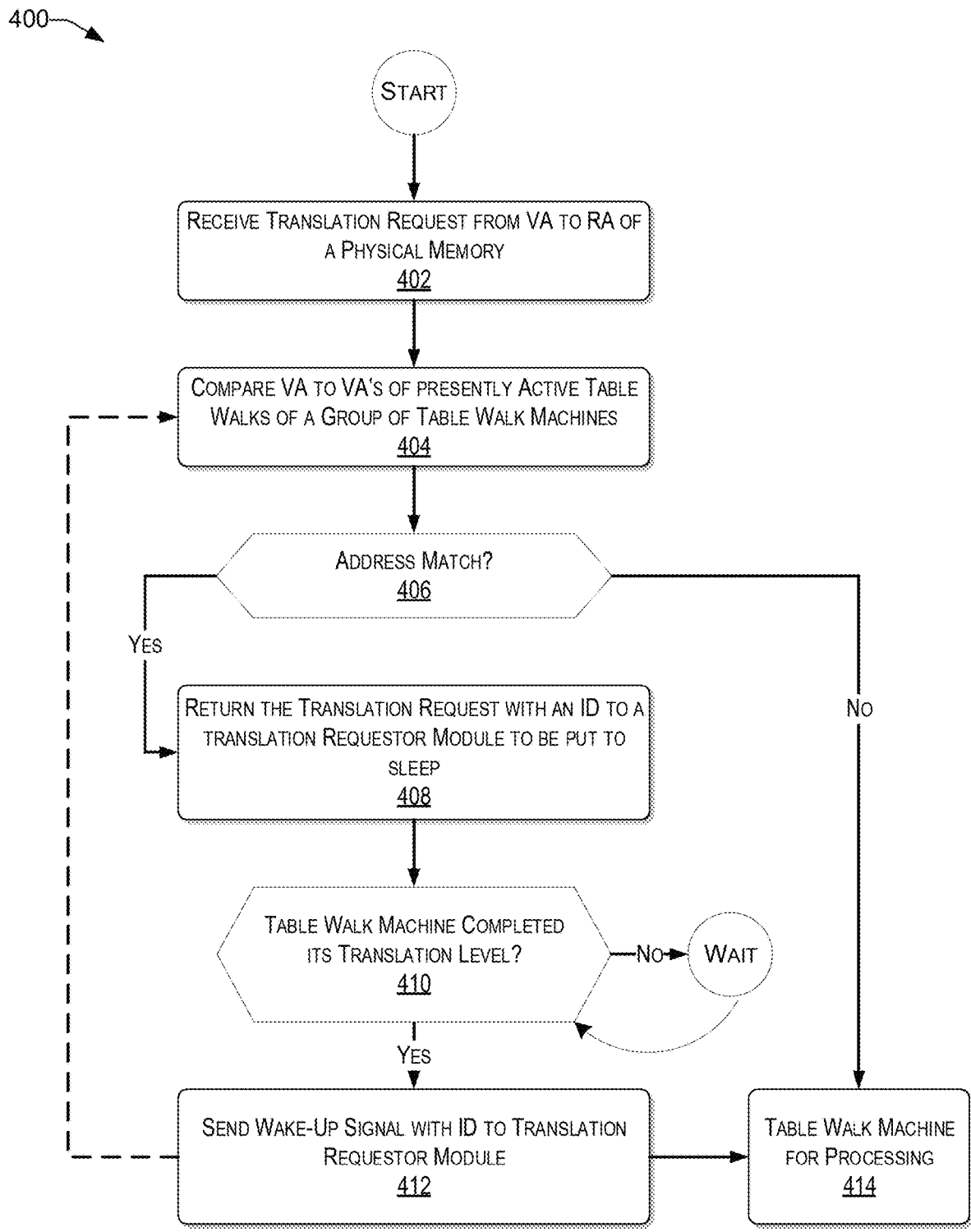
FIG. 4 is an example process flow for a memory address translation in a multiple page size environment, consistent with an illustrative embodiment.

With the foregoing overview of the example systems 100 and 200, it may be helpful now to consider a high-level discussion of an example process. To that end, FIG. 4 presents an illustrative process 400 of translating memory addresses while supporting parallel table walks, consistent with an illustrative embodiment. Process 400 is illustrated as a collection of blocks in a logical flowchart, which represents sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 400 is described with reference to the architecture of FIG. 1.

At block 402, the translation cache 110 receives a translation request from a virtual address (VA) to a real address (RA) of a physical memory.

At block 404, the translation cache 110 compares the received VA to the VA's of all presently active table walks of a group of table walk machines 130 to 136.

Upon determining, based on the comparison, that there is no address match in a given table walk machine of a group of table walk machines (i.e., "No" at determination block 406), the request is forwarded to block 414, where a table walk machine (e.g., 130 of the group of table walk machines 130 to 136) processes the translation request.

However, upon determining, that there is an address match in a given table walk machine of a group of table walk machines (i.e., "Yes" at determination block 406), the process continues with block 408 the translation request is returned with an identification number (ID) to a translation requestor module to be put to sleep. Stated differently, the translation request is temporarily stalled.

At block 410, it is determined whether the given table walk machine has completed its translation level. If so (i.e., "Yes" at determination block 410), the process continues with block 412, where a wake-up signal with the ID 140 is sent to the translation requestor module 102 to trigger a wake-up and processing 414 of the put to sleep translation request (e.g., 103). In one embodiment, when a "put to sleep" request receives a wake-up signal, the process continues with block 404, where the translation cache 110 compares the received VA to the VA's of all presently active table walks of a group of table walk machines 130 to 136. The next address comparison includes more bits since the active TW has completed a level. In this way, a table walk of the VA of the translation request with the ID is facilitated in parallel with one or more other table walks of other translation requests of the group of table walk machines (e.g., 130 to 136).

Example Computer Platform

Figure 5:
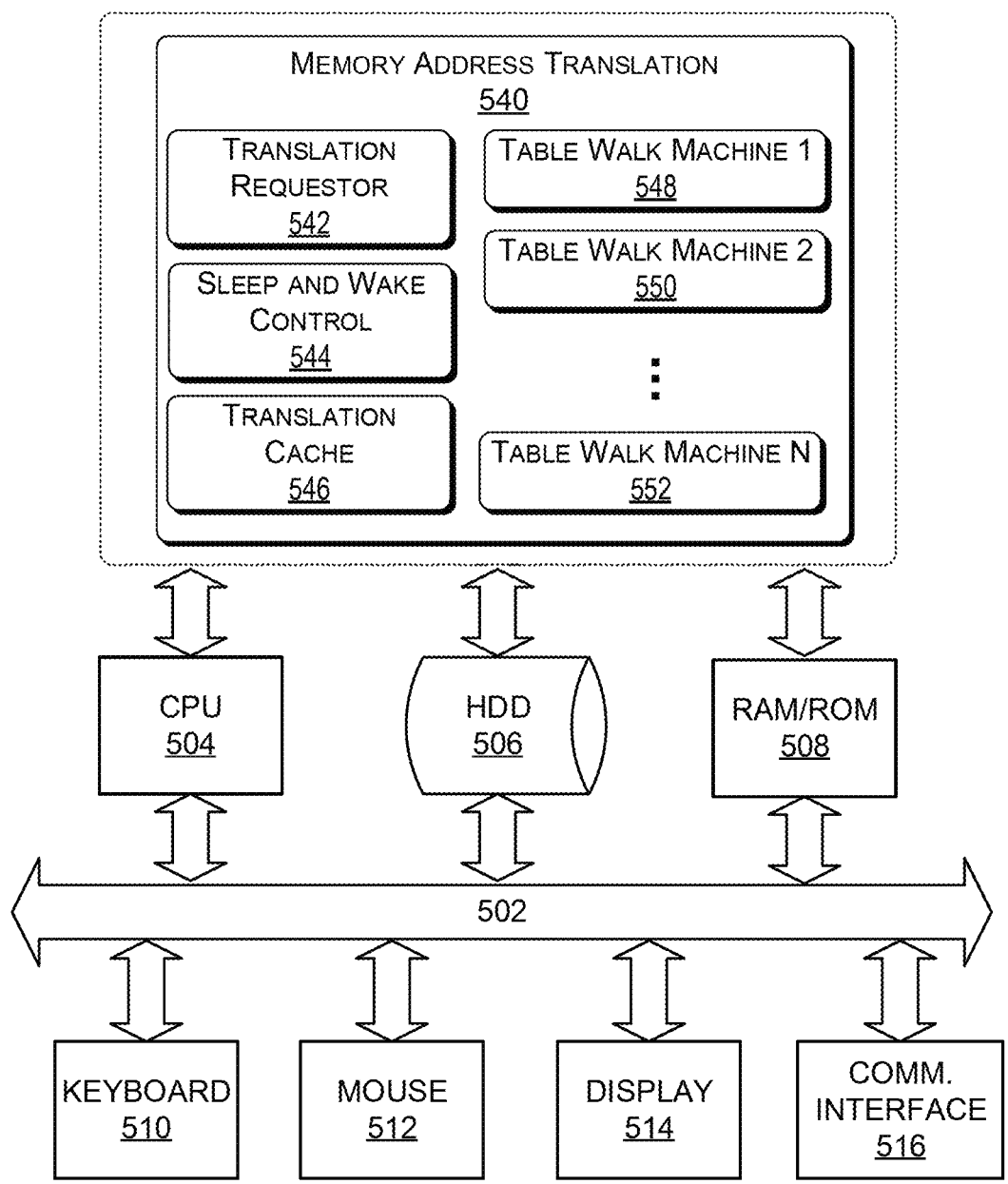
FIG. 5 provides a functional block diagram illustration of a computer hardware platform that can be used to host a memory address translation system.

In one embodiment, functions relating to providing a memory address translation system that facilitates maximum parallelism, can be performed with the use of one or more computing devices. FIG. 5 provides a functional block diagram illustration of a computer hardware platform 500 that can be used to host a memory address translation unit 540.

The computer platform 500 may include a central processing unit (CPU) 504, a hard disk drive (HDD) 506, random access memory (RAM) and/or read only memory (ROM) 508, a keyboard 510, a mouse 512, a display 514, and a communication interface 516, which are connected to a system bus 502.

In one embodiment, the HDD 506, has capabilities that include storing a program that can execute various processes, such as the Memory address translation unit 540, in a manner described herein. The Memory address translation unit 540 may have various modules configured to perform different functions, such those discussed in the context of FIGS. 1 and 2. For example, there may translation requestor operative to provide translation requests from a VA to a RA. There may be a sleep and wake control module 544 operative to determine a status of the presently active table walk machines and control the sleep and wake status of its requests accordingly. There may be a translation cache configured to receive the cache request from the translation requestor module 542 and provide it to one or more table walk (TW) machines (e.g., 548 to 552) or the sleep and wake control module 546 depending on whether there is an address "hit" or an address "miss." These modules may perform all the functions discussed herein and others.

While modules 542 to 552 are illustrated in FIG. 5 to be part of the HDD 506, in some embodiments, one or more of these modules may be implemented in the hardware of the computing device 500. For example, the modules discussed herein may be implemented in the form of partial hardware and partial software. That is, one or more of the components of the Memory address translation unit 540 shown in FIG. 5 may be implemented in the form of electronic circuits with transistor(s), diode(s), capacitor(s), resistor(s), inductor(s), varactor(s) and/or memristor(s). In other words, Memory address translation unit 540 may be implemented with one or more specially-designed electronic circuits performing specific tasks and functions described herein by components of the CPU and/or modules of the RAM/ROM 508.

Example Cloud Platform

As discussed above, functions relating to providing a unified memory address translation system, may include a distributed computing and/or storage architecture as in a cloud. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
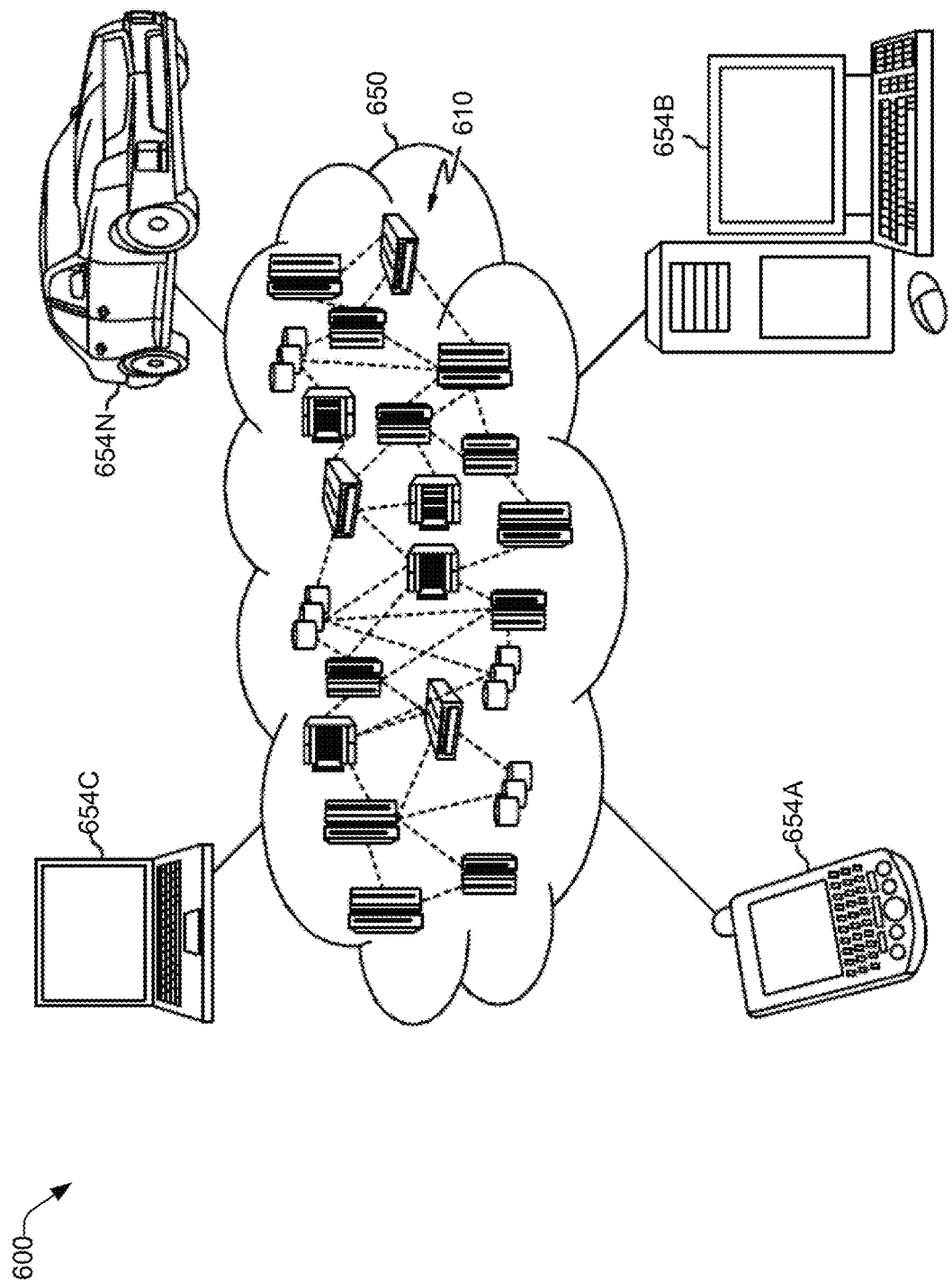
FIG. 6 depicts a cloud computing environment, consistent with an illustrative embodiment.

Referring now to FIG. 6, an illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
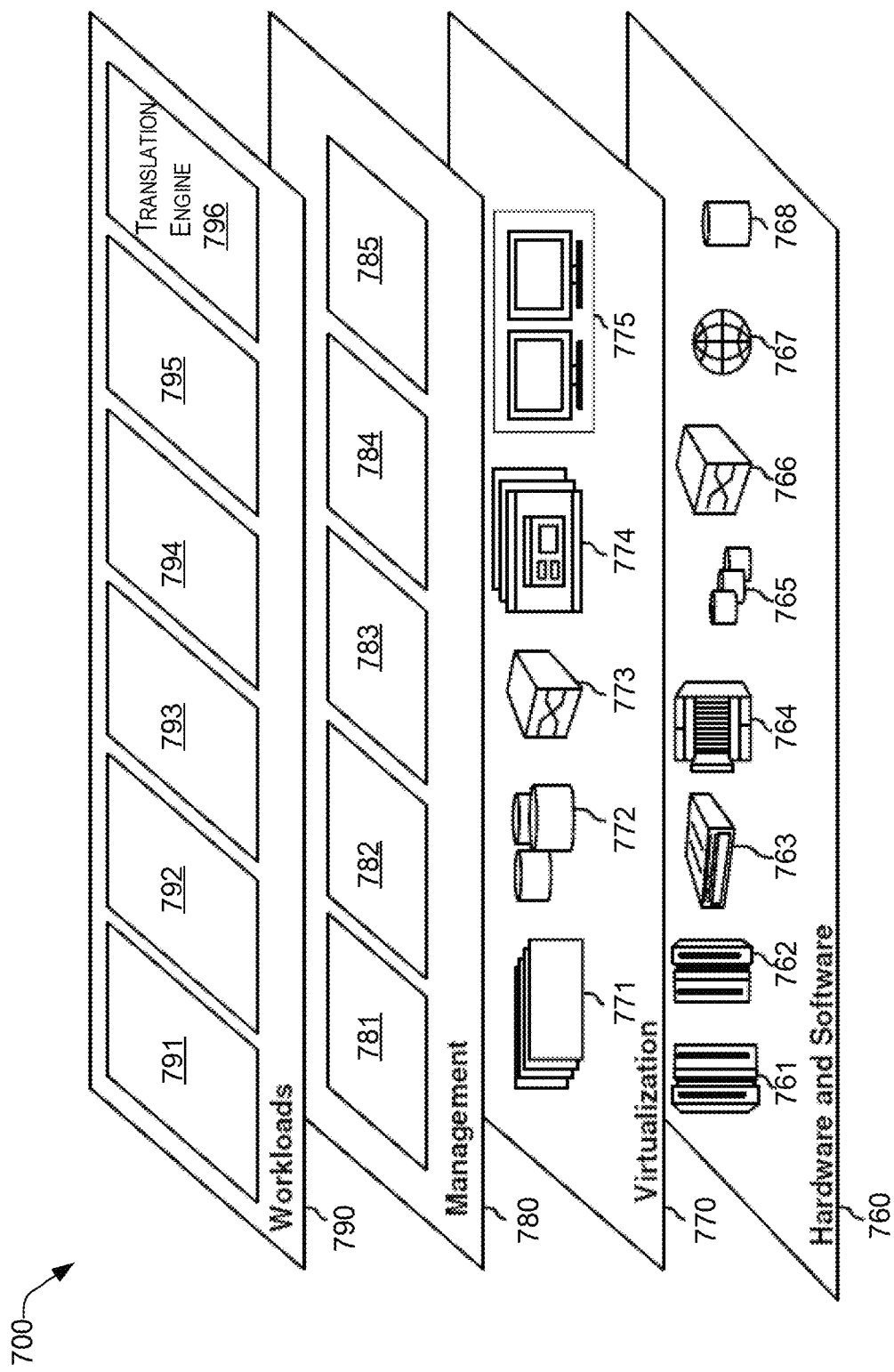
FIG. 7 depicts abstraction model layers, consistent with an illustrative embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and Translation Engine 796, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of providing a memory address translation in a multiple page size environment, comprising:
   receiving a translation request to translate from a virtual address (VA) to a real address (RA) of a physical memory;
   comparing the received VA to VA's of all presently active table walks of a group of table walk machines; and
   upon determining, based on the comparison, that there is an address match in a given table walk machine of the group of table walk machines, sending the translation request with an identification number (ID) to a translation requestor module, the translation request to be put to sleep;
   upon determining that the given table walk machine has completed its translation level, sending a wake-up signal with the ID to the translation requestor module, the translation requestor module to trigger a wake-up and processing of the put to sleep translation request; and
   in response to (i) the triggering of the wake-up and the processing of the put to sleep translation request and (ii) determination that there is no address match between the received VA and the given table walk machine, providing a table walk, of the VA of the translation request with the ID, in parallel with one or more other table walks of other translation requests of the group of table walk machines.

2. The method of claim 1, wherein the comparison of the received VA to all the VA's of the presently active table walks comprises, for each presently active table walk: comparing virtual address bits of the received VA to a range of addresses in a translation level of the presently active table walk.

3. The method of claim 1, wherein the comparison of the received VA to all the VA's of the presently active table walks comprises, for each active table walk, using a translation level of the active table walk to determine a number of address bits to compare to determine whether there is an address collision.

4. The method of claim 1, wherein the comparison of the received VA to all the VA's of the presently active table walks comprises, for each presently active table walk, comparing most significant bits (MSB's) of address, of the presently active table walk, down to bit boundary of largest page size supported.

5. The method of claim 1, in response to (i) the triggering of the wake-up and the processing of the put to sleep translation request and (ii) the determination that there is no address match between the received VA and the given table walk machine, sending the translation request to be processed directly by a table walk machine of the group of table walk machines.

6. The method of claim 1, wherein comparing, the received VA to the VA's of all the presently active table walks, is responsive to determining that the translation request of the VA was not previously successfully processed by a translation cache module.

7. The method of claim 1, wherein the translation request comprises at least one of:
   a hashed page table (HPT) request;
   a segment table request;
   a non-nested radix request; or
   a nested radix request.

8. The method of claim 1, wherein the completed translation level is a Level 1 Radix Tree Directory Base (RTDB), which is used as a base address of a first radix translation table.

9. The method of claim 1, wherein a next level of the given table walk machine is a Page Table Entry (PTE), which is used to define a next range of a translation.

10. A memory address translation system comprising:
a translation requestor module configured to provide a translation request to translate from a virtual address (VA) to a real address (RA) of a physical memory;
a translation cache module coupled to the translation requestor module and configured to receive the translation request from the translation requestor module;
a group of table walk machines coupled to the translation cache module and the translation requestor module and configured to perform table walks; and
a sleep and wake control module coupled to the translation requestor module, translation cache module, and the group of table walk machines, wherein the sleep and wake control module is configured to:
compare the received VA to VA's of all presently active table walks of the group of table walk machines;
upon determining, based on the comparison, that there is an address match in a given table walk machine of the group of table walk machines, sending the translation request with an identification number (ID) to the translation requestor module, the translation request to be put to sleep;
upon determining that the given table walk machine has completed its translation level, sending a wake-up signal with the ID to the translation requestor module, the translation requestor module to trigger a wake-up and processing of the put to sleep translation request; and
in response to (i) triggering of the wake-up and the processing of the put to sleep translation request and (ii) determination that there is no address match between the received VA and the given table walk machine, providing a table walk, of the VA of the translation request with the ID, in parallel with one or more other table walks of other translation requests of the group of table walk machines.

11. The system of claim 10, wherein the system supports multiple page sizes.

12. The system of claim 10, wherein the comparison of the received VA to all the VA's of the presently active table walks comprises, for each presently active table walk, comparing virtual address bits of the received VA to a range of addresses in a translation level of the presently active table walk.

13. The system of claim 10, wherein the comparison of the VA to the VA's of the presently active table walks comprises, for each active table walk, using a translation level of the active table walk to determine a number of address bits to compare to determine whether there is an address collision.

14. The system of claim 10, wherein the comparison of the received VA to all the VA's of the presently active table walks comprises, for each presently active table walk, comparing most significant bits (MSB's) of address, of the presently active table walk, down to bit boundary of largest page size supported.

15. The system of claim 10, in response to (i) the triggering of the wake-up and the processing of the put to sleep translation request and (ii) the determination that there is no address match between the received VA and the given table walk machine, sending the translation request to be processed directly by the given table walk machine of the group of table walk machines.

16. The system of claim 10, wherein comparing, the received VA to the VA's of all the presently active table walks, is responsive to determining that the translation request of the VA was not previously successfully processed by the translation cache module.

17. The system of claim 10, wherein the translation requestor module is configured to provide at least one of the following translation requests:
a hashed page table (HPT) request;
a segment table request;
a non-nested radix request; or
a nested radix request.

18. The system of claim 10, wherein:
the completed translation level is a Level 1 Radix Tree Directory Base (RTDB), which is used as a base address of a first radix translation table; and
the sleep and wake control module is configured to use the Level 1 RTDB as a base address of a first radix translation table.

19. A computing device comprising:
a processor;
a physical memory coupled to the processor;
a memory address translation system coupled to the processor and configured to:
receive a translation request to translate from a virtual address (VA) to a real address (RA) of the physical memory;
compare the received VA to VA's of all presently active table walks of a group of table walk machines; and
upon determining, based on the comparison, that there is an address match in a given table walk machine of the group of table walk machines, send the translation request with an identification number (ID) to a translation requestor module, the translation request to be put to sleep;
upon determining that the given table walk machine has completed its translation level, send a wake-up signal with the ID to the translation requestor module, the translation requestor module to trigger a wake-up and processing of the put to sleep translation request; and
in response to (i) the triggering of the wake-up and the processing of the put to sleep translation request and (ii) determination that there is no address match between the received VA and the given table walk machine, provide a table walk, of the VA of the translation request with the ID, in parallel with one or more other table walks of other translation requests of the group of table walk machines.

20. The computing device of claim 19, wherein the memory address translation system supports multiple page sizes.

* * * * *